Figure 1:
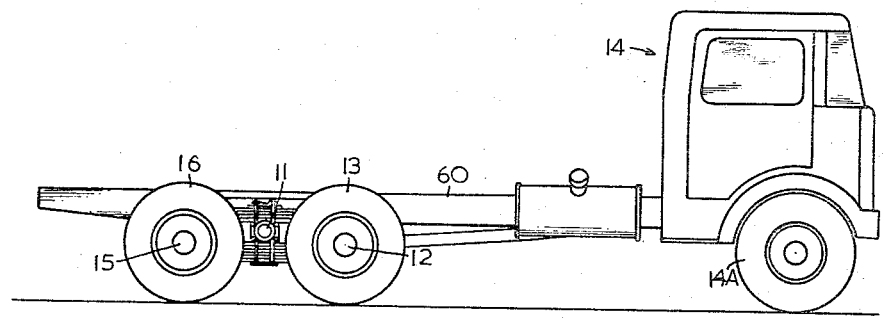

April 11, 1967 R. F. WHITEHEAD 3,313,369
SUSPENSIONS FOR VEHICLES HAVING TANDEM AXLES
Filed Aug. 6, 1965 3 Sheets-Sheet 3

United States Patent Office 3,313,369
Patented Apr. 11, 1967

3,313,369
SUSPENSIONS FOR VEHICLES HAVING
TANDEM AXLES
Robert Frederick Whitehead, 56 Boundary Road, Chester
Hill, near Sydney, New South Wales, Australia
Filed Aug. 6, 1965, Ser. No. 477,979
Claims priority, application Australia, Aug. 7, 1964,
47,891/64
10 Claims. (Cl. 180—22)

This invention relates to bogies for trucks, particularly heavy trucks, semi-trailers, tipping trailers and the like.

Its object is to provide an improved four-wheel swiveling truck or bogie for use in connection with six-wheel vehicles, which is distinguished from other bogies of this type in that it can be so connected with and suspended from the vehicle frame or chassis, that smooth riding of the truck or trailer is ensured even when travelling over highly irregular surfaces and/or through sharp curves.

The invention is based on the idea of providing on the bogie, in addition to the driving wheels which are connected to the vehicle drive by a differential, a pair of rear wheels on a common axle—the trailing axle—which during travel ensure a steady support of the vehicle at its rear, the trailing axle on the one hand, and the forward driving axle or axles on the other hand, being so connected with a suspension axle or trunnion arranged about centrally in the bogie, by torque rods or equivalent resilient members, that the two rear wheels jointly, and each of the driving axles separately, are capable of a limited displacement relative to the said trunnion under the action of shocks imparted to the bogie wheels during the travel of the vehicle over a road or other surface. It is a further feature of the invention that the vehicle frame or chassis is supported on the bogie by springs which are mounted to and about the said trunnion and are not positively connected either to the driving axles or to the trailing axle, but are arranged to slidingly engage supporting elements which are associated with these axles. The springs transfer the vertical load from the vehicle chassis onto the wheels of the bogie. Owing to the sliding arrangement of the springs on these supporting elements the axles of the bogie are capable of limited and independent displacement relative to the vehicle chassis during the travel of the vehicle, caused by irregularities of the road surface, and the chassis is considerably less affected by oscillations of the bogie relative thereto than in known constructions.

According to the invention the bogie comprises, in addition to the driving axle or axles and the trailing axle, a bogie suspension axle or trunnion arranged between, and extending substantially parallel to, said driving and trailing axles, two mountings for rigid attachment to the opposite sides of the vehicle chassis and rigidly secured to said trunnion in mutually spaced relationship, two hubs rotatably mounted on said trunnion at opposite sides of the bogie, at least two sets of leaf springs at the opposite sides of the bogie each set having a middle section and two end portions which extend freely forward and rearward from said middle section in the direction of the bogie travel, the middle section of the set or sets on each side of the bogie being firmly connected with the hub on the same side of the bogie, the forward extending portions of the sets of leaf springs bearing resiliently upon elements rigidly connected with the driving axle or axles of the bogie and the rearward extending portions of the sets of leaf springs bearing resiliently upon elements rigidly connected with the trailing axle; the bogie further comprising torque rods which pivotally and, where required, resiliently connect the said trunnion with the driving axle or axles, and with the said trailing axle, respectively.

The aforementioned mountings are preferably constituted by carrier plates which in the mounted position depend from the vehicle chassis, near the rear end of the latter. The trunnion is connected to these plates preferably by welding, and the hubs are rotatable on the opposite end portions of the trunnion, which project outwardly from said plates.

The elements which support the free ends of the sets of springs may be constituted by pins, bars or other elements which extend between opposite sides of guides for the sets of springs.

The springs may be of the so-called half-elliptic type of suspension springs. The springs of each set are preferably of different lengths which increase from the top to the bottom of each set. The free ends of the lowermost spring of each set, which is the longest spring in the set, are with advantage bent downwardly.

Figure 2:
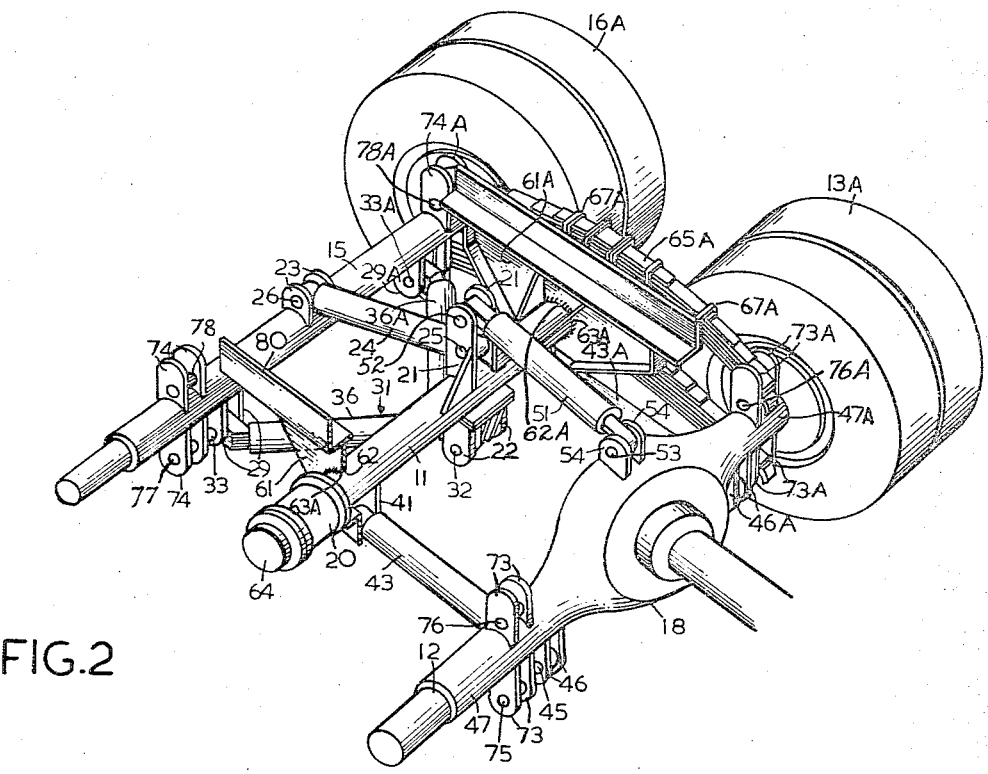
Figure 3:
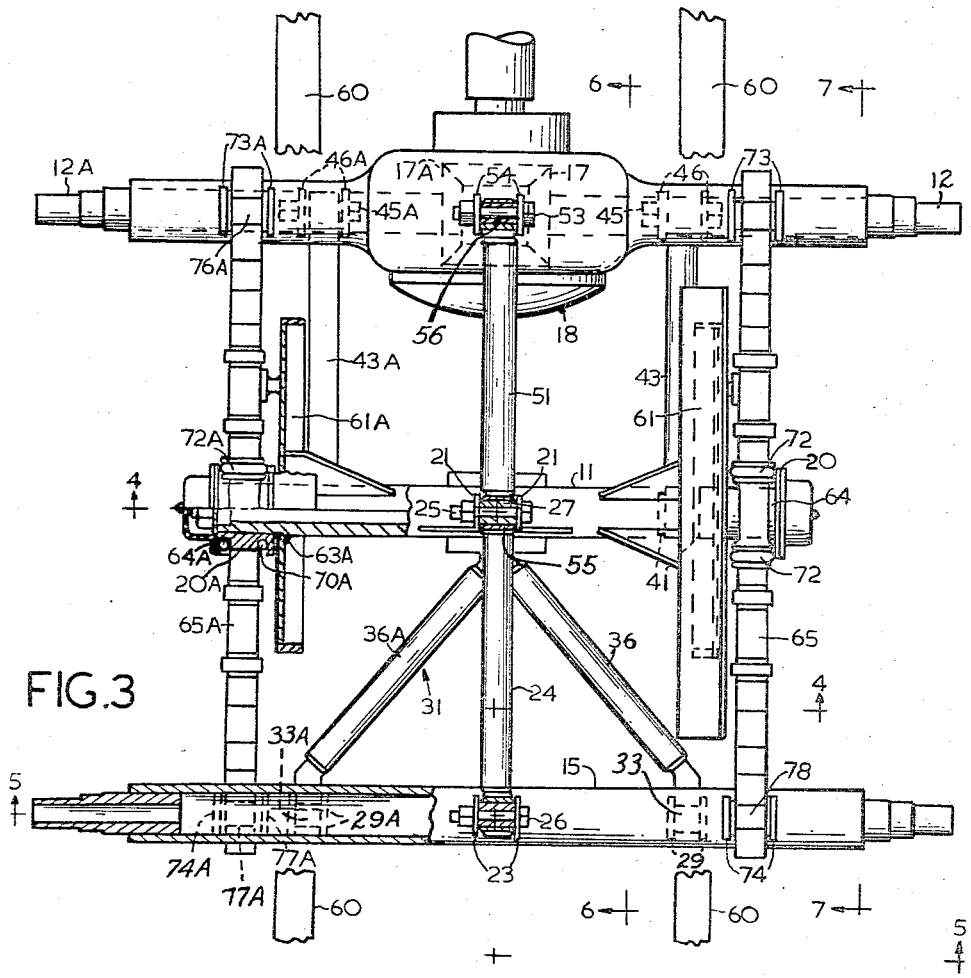
Figure 4:
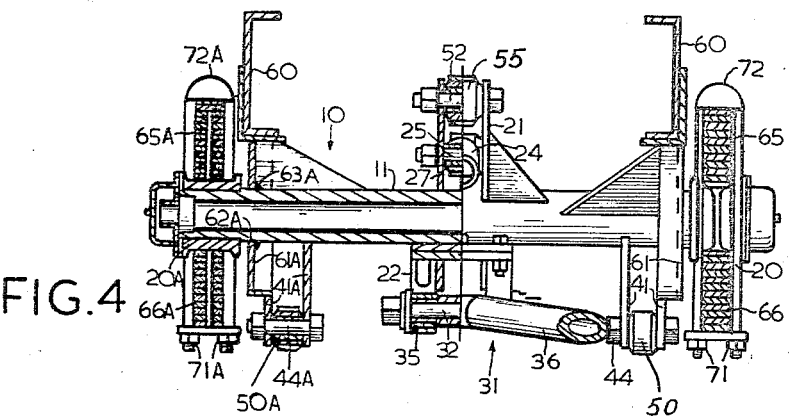
Figure 5:
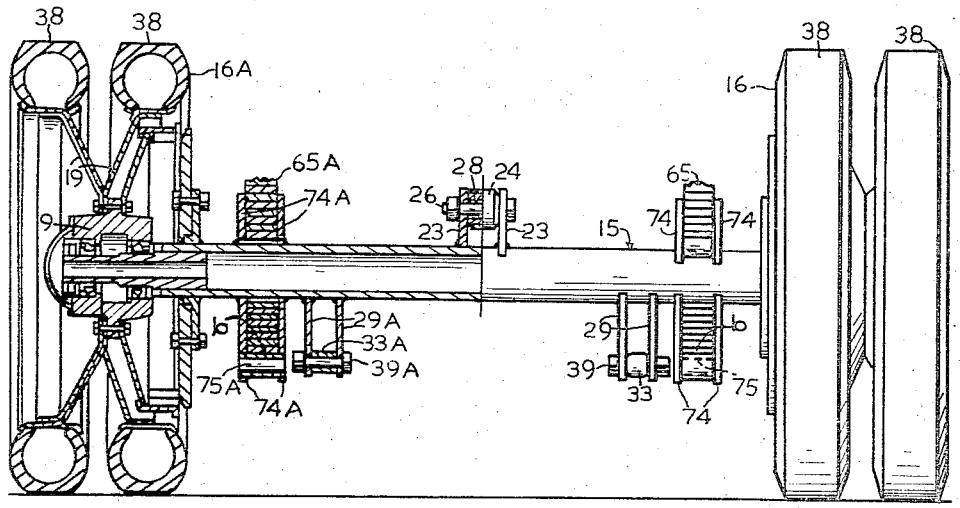
Figure 6:
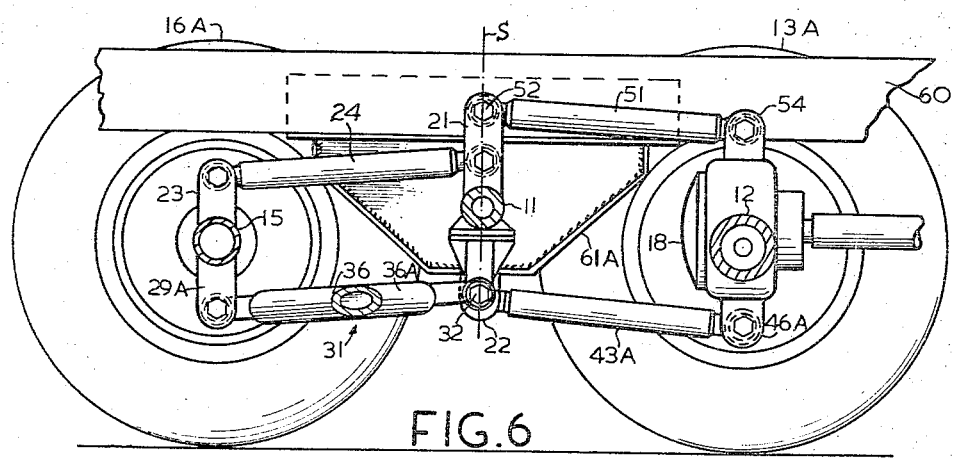
Figure 7:
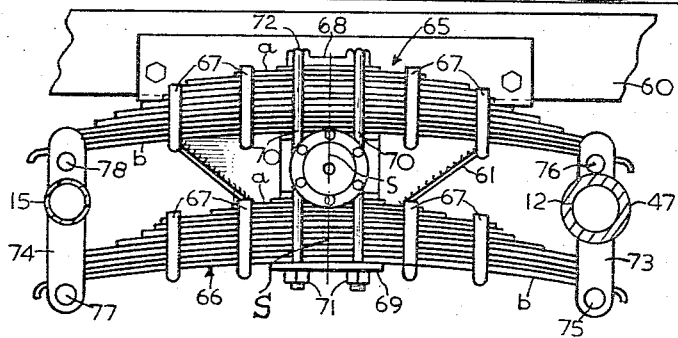

In order to more particularly describe the invention, reference is made to the accompanying drawings, which, by way of example only, illustrate a specific embodiment of the invention, and wherein:

FIG. 1 is an elevational view showing a truck with the rear of its chassis mounted on a bogie according to the invention, FIG. 2 is a perspective view illustrating the essential parts of the bogie assembly, some parts being omitted for the sake of clarity, FIG. 3 is a plan view of the bogie assembly, partly in section, FIG. 4 is a view of the bogie showing the suspension axle or trunnion and associated parts, partly in section, taken on line 4—4 of FIG. 3, FIG. 5 is a view of the bogie showing the trailing axle and associated parts, partly in section taken on line 5—5 of FIG. 3, FIG. 6 is an elevational view of the bogie partly in section on line 6—6 of FIG. 3, and FIG. 7 is a side elevation showing the spring assembly, partly in section taken on line 7—7 of FIG. 3.

In this specific example the four-wheel swivelling truck or bogie comprises a central axle or trunnion 11. At a distance in front of the trunnion 11 is provided a pair of separate driving axles 12 and 12A for the driving wheels 13 and 13A of the bogie, which are also the driving wheels for the vehicle 14 on which the bogie is used. Substantially at the same distance behind the trunnion 11 there is provided a single rear or trailing axle 15 for the rear wheels 16 and 16A of the bogie 10.

The front wheels of the vehicle are denoted by 14A. In the embodiment shown the hub 9 of each wheel carries on axially spaced flanges 19 two parallel wheel rims 30 with separate tyres 38, for heavy loads, but the use of double wheels is not essentially to the invention.

The two forward driving axles 12, 12A are each connected to one of the two driven pinions 17, 17A of the differential 18 of the vehicle 14. The trunnion 11, the trailing axle 15, and the two axles 12, 12A for the driving wheels 13 and 13A of the bogie 10 extend all parallel to each other and are approximately on the same level relative to the bogie.

The trunnion 11 is tubular and is provided at each of its opposite ends with a hub 20 and 20A, respectively. Substantially vertical pairs of carrier lugs 21 and 22 (FIGS. 2 and 4) are provided centrally on the trunnion 11, the lugs 21 projecting upwardly and the lugs 22 downwardly therefrom. Another pair of lugs 23 stands up from the centre of the trailing axle 15 (FIG. 2 and 5) and a torque rod 24 extends axially in relation to the assembly, between two horizontal pins 25, 26 supported, respectively, by the pairs of lugs 21 and 23. The opposite ends of the torque rod 24 are connected with the pins 25 and 26 respectively, by rubber or like resilient bushes 27 and 28 (FIGS. 4 and 5).

Two additional pairs of lugs 29 and 29A project downwardly from the trailing axle 15, one pair 29 near the end of said axle which carries the wheel 16, and the other pair 29A near the other end of the trailing axle 15 carrying the wheel 16A. A substantially V-shaped torque bar or "wish-bone" 31 (FIGS. 2, 3 and 4) made of steel tubing connects a horizontal pin 32 between the downwardly extending carrier lugs 22, with horizontal pins 33 and 33A which are carried, respectively, by the two pairs of lugs 29 and 29A. The connection of the wish-bone 31 with the pin between the carrier lugs 22 is effected by rubber bushes 35 or the like, whereas the connection of the divergent arms 36 and 36A of the wish-bone 31 with the pins 33 and 33A between the pairs of lugs 29 and 29A, respectively, is preferably effected by means of shackle bolts 39 and 39A which can be greased—although, alternatively, rubber bushes may be used here also, if so desired, instead of the shackle bolts.

Two further pairs of lugs 41 and 41A, respectively, project downwardly from the centre axle or trunnion 11 near the opposite ends thereof. A torque bar 43 connects a horizontal pin 44 between the lugs 41 with a horizontal pin 45 between a pair of lugs 46 which depend from the housing 47 for the driving axle 12. A further torque bar 43A connects a horizontal pin 44A between the lugs 41A with a horizontal pin 45A between another pair of lugs 46A which depend from the housing 47A for the other driving axle 12A of the bogie. The ends of the torque bar 43 are connected with the pins 44 and 45, respectively, by means of rubber bushes 50. The ends of the torque bar 43A are connected with the pins 44A and 45A, respectively, by rubber bushes 50A.

A still further axially arranged torque bar 51 (FIGS. 2, 3 and 4) interconnects a second horizontal pin 52 supported by the carrier lugs 21, at a level above the pin 25, and a pin 53 supported by a pair of lugs 54 which are arranged centrally on the housing for the differential 18. The torque bar 51 is connected to the pins 52 and 53, likewise by rubber bushes 55 and 56, respectively. The torque bars 24, 43, 43A and 51 extend all about parallel to the longitudinal axis of the bogie, the bars 24 and 51 being both arranged in the vertical median plane of the bogie.

For mounting the above described assembly or bogie to the rear of the chassis 60 of a vehicle, e.g. of a heavy truck, the chassis 60 is provided on each of its opposite sides with a plate-like side carrier or bracket 61 and 61A (FIGS. 2 to 4, 6, 7) respectively, which when the bogie is secured to the chassis of a truck or other vehicle, extends downwardly from the chassis. Each side carrier 61 and 61A is provided with a hole such as 62 and 62A (FIG. 4), the holes in the two carriers 61 and 61A being in register, and the trunnion 11 being welded into the registering holes as shown, for instance, at 63A. The opposite end portions 64 and 64A of the trunnion 11 extend through these two holes and project outwardly therefrom, as shown in FIGS. 3 and 4. A set 65 of leaf springs, preferably so-called half-elliptic suspension springs, is disposed above the projecting end portion 64 of the trunnion 11 and another set 66 of such springs underneath said end portion 64. Similarly, corresponding sets 65A and 66A of suspension springs tre arranged, respectively, above and below the opposite end portion 64A of the trunnion. Because of the symmetry of the arrangement only the spring assembly at one side of the chassis 60, i.e. the one connected with the trunnion end portion 64 is shown in FIG. 7 and is hereinafter described in detail, the spring assembly on the other side being symmetrically identical.

Each set or packet 65 and 66 of springs comprises a plurality of leaf springs of different lengths, the lengths of the springs decreasing progressively, or about progessively, from the top to the bottom of each set, in both directions from a vertical plane S (FIGS. 6 and 7) which contains the longitudinal axis of the trunnion 11. Thus the shortest leaf springs at the top of each set 65 and 66 are designated by $a$, and the longest leaf spring at the bottom of each said set by $b$. As will likewise be seen from FIG. 7, the springs of each set are held together by a number of clamps 67. The two sets 65 and 66 are clamped together between a plate 68 which overlies the shortest leaf $a$ of the set 65, and a plate 69 which engages the longest leaf $b$ of the set 66 from underneath, by screw bolts 70 and nuts 71. When the nuts 71 are tightened, the two sets 65 and 66 are urged forcefully upon the hub 20 which is carried by the trunnion end portion 64 and is capable of rotation thereon through an angle.

In the embodiment illustrated the two clamping bolts 70 on each side of the extension 64 and hub 20 are made in one piece and connected by a U-shaped portion 72, so that the tightening nuts 71 are provided only at the lower ends of the bolts 70.

The free ends of the lowermost spring $b$ of each set are inserted in guides 73, 73A and 74, 74A which are mounted on the housings 47 and 47A for the driving axles 12 and 12A and on the trailing axle 15, respectively, of the bogie. Within the upstanding portions of these guides the free ends of the lowermost springs $b$ of the upper sets 65 and 65A overlie pins 76, 76A and 78, 78A, respectively, which extend across these guide portions. Similarly, the free ends of the lowermost springs $b$ of the lower spring sets 66 and 66A overlie the pins 75, 75A and 77, 77A which extend, respectively, between the depending portions of the guides 73, 73A and 74, 74A.

Preferably, the extremities of the lowermost spring $b$, at least, of each lower set 66, 66A are turned downwardly for the purpose of resisting a slipping of these springs from the pins which they overlie, under extreme conditions.

The assembly described above comprising the axles 12, 12A, 15, the torque bars, the wish-bone 31, the side carriers 61, 61A the springs 65, 65A and 66, 66A and their mountings, and the guides 73, 73A and 74, 74A for these springs, is preferably built up as a unit and this unit is secured to the chassis 60, preferably by bolting the side carriers 61, 61A to the opposite sides of the chassis 60.

The arrangement described permits the position of the driving and trailing axles of the bogie to vary slightly relative to that of the trunnion 11, depending on the extent to which the chassis 60 is loaded, the free ends of the lowermost springs $b$ of each set bearing upon the pins supporting same so that these springs can slide freely within the spring guides 73, 73A and 74, 74A in response to variations of the load on the chassis and to shocks exerted on the bogie wheels due to unevenness of the road surface.

Thus the bogie is suspended from the chassis 60 of the vehicle solely by the trunnion 11, about which the driving axles 12, 12A and the trailing axle 15 can swing within limits defined by the resiliency of the torque bars 24, 51, 43, 43A and of the wish-bone 31, and of their respective connections with the pins to which these bars and the wish-bone are attached.

Shocks exercised upon the bogie due to irregularities of the surface on which the vehicle travels are taken up by the front driving axles 12, 12A and by the trailing axle 15 of the bogie, respectively. The independent suspension of the driving axles 12, 12A of the bogie from the trunnion 11 by the torque bars 43 and 43A permits the independent adaptation and displacement of the driving wheels 13 and 13A relative to the bogie, and to the vechile, whenever one or the other of the driving wheels rides over a bump or similar obstruction on the road surface or enters a cavity therein, for instance a pot-hole, the resiliency of the connection of the driving axles 12, 12A by the torque bars 43 and 43A with the trunnion 11, in conjunction with that of the central torque bar 51 tending to restore the system to its normal symmetrical condition as soon as the obstruction has been passed.

Irregularities in the surface can also be taken by the rear wheels 16 and 16A on the trailing axle 15, but the latter can oscillate as a unit in a plane perpendicular to the longitudinal axis of the bogie, due to the suspension of the trailing axle 15 by means of the wish-bone 31. The central torque bar 24 assists the return of the trailing axle 15 to its normal position.

Displacements of the driving axles 12, 12A and/or of the rear axle 15, due to irregularities of the surface on which the vehicle rides, are not transferred to the chassis 60 by the trunnion 11 to a substantial extent. The arrangement of the two sets of springs 65, 65A and 66, 66A on each side of the chassis 60 permits the ends of these sets to slide freely within their guides 73, 73A and 74, 74A, the spring sets to be deformed accordingly, and the hubs 20 and 20A to be rotated about the end portions 64 and 64A of the trunnion 11 during travel of the vehicle. Hence the position of the trunnion 11 relative to the road surface varies only slightly so that the chassis 60 rests resiliently on the bogie 10 and rides smoothly over the road surface even though the irregularities of the latter may be very considerable.

When the vehicle fitted with the bogie according to the invention travels through curves—even though narrow curves—the trailing axle 15 and the front axles 12, 12A of the bogie are capable of a slight angular displacement relative to each other due to the manner in which the mountings for the springs are secured to the end portions 64 and 64A of the centre axle 11 at the opposite ends of the latter, the wishbone 31 which is mounted behind the driving axles 12, 12A being thrown out to some extent when cornering. This movement of the wish-bone 31 jointly with the trailing axle 15, although limited, eliminates tyre scrub to a considerable extent.

I desire it to be understood that I do not wish protection by Letters Patent to be limited to the above described details as these are capable of modification, in various ways, within the scope and ambit of the appended claims.

Thus, for instance, the wish-bone may be reinforced, if so desired, particularly about the location in which its divergent arms meet.

The shape and/or the size of the various parts of the assembly may be varied to suit different types, designs and sizes of the vehicle on which the assembly is to be used.

Likewise it is possible to vary the design and the number of the springs, the design of the spring mountings or hubs, and of other parts of the assembly as well as the manner in which the assembly is fastened to the chassis of a vehicle.

The connection of the torque bars and/or of the wish-bone to the pins by which these members are supported may also be varied, if so required.

I claim:

1. A bogie for the rear wheels of a road vehicle having a chassis, front wheels and two pairs of rear wheels, said bogie comprising a driving axle, a trailing axle spaced from said driving axle, a bogie suspension trunnion arranged between and extending substantially parallel to said driving and trailing axles, two mountings for rigid attachment to opposite sides of the vehicles chassis and rigidly secured to said trunnion in mutually spaced relationship, two hubs rotatably mounted on said trunnion at opposite sides of the bogie, an upper set of leaf springs arranged above each said hub and a lower set of leaf springs arranged below each said hub, said sets having each a middle section, and two end portions one of which extends freely forward and the other rearward from said middle section in the direction of the bogie travel, the two sets of leaf springs at any one side of the bogie being rigidly connected to each other and to the one of said hubs which is arranged at the same side of the bogie as the respective two sets of leaf springs, the forward extending portions of said sets of leaf springs bearing freely and resiliently upon elements rigidly connected with the said driving axle, and the rearward extending portions of said sets of leaf springs bearing freely and resiliently upon elements rigidly connected with the said trailing axle; and the bogie further comprising torque rods which connect the said driving axle with the said trunnion, including one pair of torque rods which extend between lugs arranged near the respective side of the bogie on the underside of the driving axle and on the underside of the trunnion, respectively, and a further torque rod which extends between lugs arranged in the median plane of the bogie on the upper side of the driving axle and on the upper side of the trunnion, respectively; and further torque rods which connect the said trailing axle with the said trunnion including two torque rods which extend between lugs arranged centrally on the underside of said trunnion and lugs arranged on the underside of the trailing axle near the opposite sides of the bogie and a further torque rod extending in the median plane of the bogie between lugs on the upper side of the trailing axle and on the trunnion, respectively; the connection of at least some of said torque rods with the respective lugs being effected by resiliently deformable bushes on pins carried by said lugs.

2. A bogie as claimed in claim 1, wherein the upper and lower sets of leaf springs on each side of the bogie are connected with each other by bolts which between them constrain the hub on said trunnion and located at the same side of the bogie as the said sets.

3. A bogie as claimed in claim 1, wherein the upper and lower sets of leaf springs on each side of the bogie are connected with each other by pairs of bolts located, respectively, in front of and behind the hub carried by the trunnion on the same side of the said sets of springs the said pairs of bolts being so arranged relative to the said hub that they constrain it between them and thereby cause a partial rotation of said hub about the trunnion in response to displacement of end portions of said sets of leaf springs relative to the said mountings due to a vertical displacement of the said driving axle or of the said trailing axle.

4. A bogie as claimed in claim 3, wherein the bolts of each said pair are united with each other by a U-shaped connection, whereas the ends of the bolts of each pair remote from said U-shaped connection carry nuts by means of which the rigid connection of the upper and lower sets of leaf springs to each other and to the said hub is effected.

5. A bogie as claimed in claim 1, wherein the upper and lower sets of leaf springs on each side of the bogie are connected with each other by pairs of bolts located, respectively, in front of and behind the hub carried by the trunnion on the same side of the said sets of springs, the said pairs of bolts being so arranged relative to the said hub that they constrain it between them and thereby cause a partial rotation of said hub about the trunnion in response to displacement of end portions of said sets of leaf springs relative to the said mountings due to a vertical displacement of the said driving axle or of the said trailing axle; and wherein the elements freely and resiliently engaged by the forward end portions of the said sets of leaf springs are mounted within guides connected with the said driving axle, whereas elements freely and resiliently engaged by the rearward end portions of the said sets of leaf springs are mounted within guides connected with the said trailing axle.

6. A bogie as claimed in claim 1, wherein the said mountings are each constituted by a plate-like side carrier for attachment to one side of the chassis of a road vehicle, each side carrier being provided with a hole through which the said trunnion is passed, the said side carriers and the said trunnion being secured to each other by welding; and wherein the upper and lower sets of leaf springs on each side of the bogie are connected with each other by pairs of bolts located respectively in front of, and behind, the hub carried by the trunnion on the same side of the said sets of springs—the words "in front of" and "behind" to the understood as being related to the normal direction of bogie travel—the said pairs of bolts being so arranged relative to the said hub that they constrain it between them and thereby cause a partial rotation of said hub about the trunnion in response to displacement of end portions of said sets of leaf springs relative to the said carrier plates due to vertical displacement of the said driving axle or of the said trailing axle relative to one of said carrier plates; and wherein the elements freely and resiliently engaged by the forward end portions of the said sets of leaf springs are mounted within guides connected with the said driving axle, whereas the elements freely and resiliently engaged by the rearward end portions of the said sets of leaf springs are mounted within guides connected with the said trailing axle.

7. A bogie according to claim 6, wherein the elements freely and resiliently engaged by the forward end portion of said sets of leaf springs comprise transverse members which extend between guides connected with the said driving axle, the elements freely and resiliently engaged by the rearward end portions of said sets of leaf springs being comprised of transverse members which extend between guides connected with the said trailing axle.

8. A bogie as claimed in claim 1, wherein shackle bolts connect the free ends of the arms of the V-shaped torque rods to the trailing axle, and the said connection of at least some of said torque rods comprises the connection to their respective members of the upper and lower torque rods extending between trunnion and drive axle, the connection of the V-shaped torque rod to the trunnion, and the connection to its respective members of the upper torque rod extending between the trunnion and trailing axle.

9. A bogie as claimed in claim 8, wherein the lowermost leaves at least of the lower sets of said leaf springs at each side of the bogie have their respective forward and rearward ends bent downwardly.

10. A bogie as claimed in claim 1, wherein the said mountings for rigid attachment to the opposite sides of the vehicle chassis are each constituted by a plate-like side carrier for attachment to one side of the chassis of a road vehicle, each said side carrier being provided with a hole through which the said trunnion is passed, and the said side carriers and the said trunnion being secured to each other by welding; and wherein, further, the elements freely and resiliently engaged, respectively, by the forward end portions and by the rearward end portions of the said leaf springs are mounted within guides connected, respectively, with the said driving axle and with the said trailing axle.

References Cited by the Examiner

UNITED STATES PATENTS

| | | | |
|---|---|---|---|
| 2,078,521 | 4/1937 | Alden | 280—104.5 |
| 2,109,191 | 2/1938 | Contardi | 180—22 |
| 2,139,937 | 12/1938 | Collender | 180—22 |
| 2,750,200 | 6/1956 | Scheel | 280—104.5 |
| 2,841,413 | 7/1958 | Pringle | 280—104.5 |

FOREIGN PATENTS 388,496    3/1933    Great Britain.

A. HARRY LEVY, *Primary Examiner.*